Feb. 2, 1954 M. GIVENS 2,667,907
TIRE CHAIN HOLDER
Filed Aug. 20, 1948

Melvin Givens Inventor
By Peter J. Taylor Attorney

Patented Feb. 2, 1954

2,667,907

UNITED STATES PATENT OFFICE 2,667,907

TIRE CHAIN HOLDER

Melvin Givens, Montclair, N. J., assignor of one-half to Peter J. Gaylor, Union, N. J.

Application August 20, 1948, Serial No. 45,349

2 Claims. (Cl. 152—236)

This invention relates to automobile tire chains of the emergency type. More specifically, it deals with a convenient and effective means for mounting such chains over tires on motor vehicles.

One especially valuable feature of the present invention is the simplicity and ease involved in the mounting operation which employs anchor strips, oppositely disposed on the wheel between the tire wall and the rim, to act as holding means for the chain.

Figure 1:
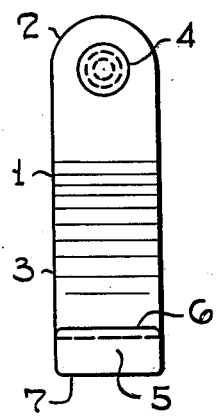
Figure 2:
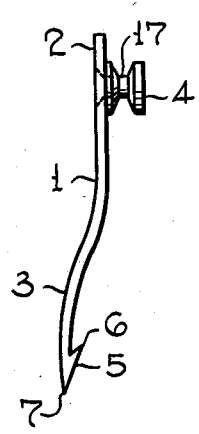
Figure 3:
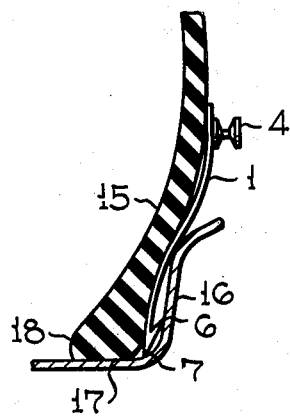
Figure 4:
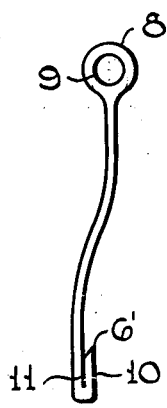
Figure 5:
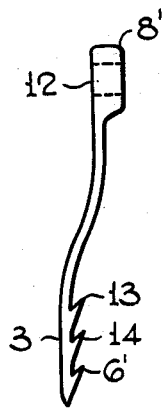
Figure 6:
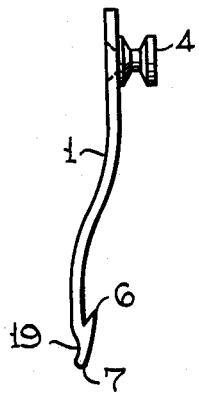

The invention will be more readily understood by reference to the accompanying drawing in which Figure 1 is a front view of an anchor strip made according to the present invention. A side view thereof is shown in Figure 2, while Figure 3 illustrates a partial cross sectional side view of tire, rim and anchor strip in mounted position. Side view of alternate designs of anchor strips made according to the present invention are depicted in Figures 4, 5 and 6. Similar numerals refer to similar parts in the various figures.

Referring again to the drawing, numeral 1 represents the body of the anchor strip comprising a substantially rigid flat metal strip, preferably having edges 3 beveled on the back side, and shaped to fit snugly against the tire. The strip has a straight upper portion with a backwardly and downwardly directed curve starting near the mid-section of said strip. The bottom edge 7 may be pointed to facilitate driving in between the tire wall and rim.

One of the important features of this invention is the use of a sharp laterally directed edge 6 or a series of such edges or protrusions 6', 14, 13, on the lower front surface of the strip, these being preferably directed upwardly as shown in the drawing. When the strip is driven between the rim and tire wall, as in Figure 3, the sharp edges 6, 6', 13, 14 bite into the inner wall of rim 16, thereby providing considerable resistance to pulling out when the chain is attached by means of a link mounted in hollow 17 of protruding knob 4 on the upper portion 2 of the strip, in a manner similar to that described in my previously filed co-pending application Serial No. 740,890, filed on April 11, 1947, of which this application is a continuation-in-part. Said application has been issued as U. S. Patent 2,461,267.

Instead of knob 4 for holding the chain, there may be provided hole 9 in widened portion 8, running partially or completely along the width of the strip, or hole 12 directed at right angles to the strip. Knob 4 is preferred, since it does not involve the pressing on the outer surface of the tire by the upper portion of the strip.

The lower portion of the strip may be beveled at 5, or it may be folded over at 11, the upper portion of folded section 10 being ground down to provide a smooth sharp edge 6', the ends of which may be rounded off as in Figure 1. Also, the lower rear portion of strip 1 may be hollowed out at 19 so that the rear of the strip would cause little deformation of the outer surface of bead 18 on tire 15.

Although one sharp edge 6 is believed to be sufficient, it is possible to provide a series of three such edges, as in Figure 5, or more, all the way up on the front surface of strip 1, facing the inner wall of rim 16.

In mounting the anchor strips on the wheel, the tire is preferably deflated partially or completely and the strip is moistened with plain or soapy water which acts as a lubricant. Then the strip is placed between the tire and rim, as in Figure 3, with the knob and sharp edges facing the operator, and the upper portion of the strip is tapped with a hammer until bottom edge 7 contacts bottom surface 17 of the rim. Another strip is mounted similarly on the other side of the tire, oppositely disposed. Knob 4 is spaced sufficiently high enough above the edge of the rim to allow insertion therebetween of the chain link or lock. The tire is then inflated and the strips are carried on the wheel at all times and employed when the emergency arises.

It is preferable to maintain maximum strip thickness in the vicinity of the rim gripping surface (6 in Figures 1-2) so that the greatest pressure exerted by the tire will be imposed thereon.

It is also possible to vary the thickness of strip 1, such as, for example, making the upper portion thicker than the lower portion. Biting edge 6 may also be provided with sharp corners, rather than round ones as shown in Figure 1, although it is preferable to shield them by the strip so that no damage is done to the tire wall.

By means of the present invention, it is possible to readily insert tire chain anchor strips which will not pull out under heavy duty conditions. Furthermore, the strips may be readily removed when the tire is deflated and they effect very little deformation to the tire wall or bead.

I claim:

1. In a holder for a tire chain section employing a substantially flat anchor strip mounted on a rimmed wheel carrying a tire and between the tire wall and the wheel rim, said rim being solid and having an outwardly directed edge, the improvement comprising an anchor strip disposed between the rim and the tire wall, said strip having an imbedded portion extending from the wheel rim base adjacent the tire bead to near the wheel rim edge, a substantially short, protruding portion on said strip curved to hug the tire wall for engaging said chain section, and at least one sharp non-resilient protrusion projecting only a short distance from the imbedded portion of the strip surface, adjacent the solid inside surface and near the base of said rim, and directed along the width of the strip in a line substantially perpendicular to the radius of the wheel at the locus of said protrusion and acting as a frictional gripping element, said imbedded portion and protrusion being the only means for preventing extraction of said anchor strips.

2. A holder for a tire chain section according to claim 1 in which the protrusion extends substantially across the whole width of the strip.

MELVIN GIVENS.

References Cited in the file of this patent

UNITED STATES PATENTS

| Number | Name | Date |
|---|---|---|
| 848,177 | Kimball | Mar. 26, 1907 |
| 953,873 | Walker | Apr. 5, 1910 |
| 1,159,320 | Lashar | Nov. 2, 1915 |
| 1,199,686 | Geake | Sept. 26, 1916 |
| 1,238,553 | Morse | Aug. 28, 1917 |
| 1,385,753 | Remar | July 26, 1921 |
| 2,258,011 | Inman | Oct. 7, 1941 |
| 2,461,267 | Givens | Feb. 8, 1949 |